(12) United States Patent  
McNutt et al.

(10) Patent No.: US 7,654,609 B1
(45) Date of Patent: Feb. 2, 2010

(54) MOTORCYCLE TRAILER SYSTEM

(75) Inventors: John McNutt, Auburn, AL (US);
William Chris Eley, Auburn, AL (US);
Lance Tyler Ellis, Auburn, AL (US);
Patrick C. Davidson, Auburn, AL (US)

(73) Assignee: Lucky Manufacturing, LLC, Auburn, AL (US)

( * ) Notice: Subject to any disclaimer, the term of this patent is extended or adjusted under 35 U.S.C. 154(b) by 198 days.

(21) Appl. No.: 11/435,484

(22) Filed: May 17, 2006

(51) Int. Cl.
*B60P 3/35* (2006.01)
(52) U.S. Cl. ...................................... 296/168; 280/789
(58) Field of Classification Search ................. 296/168, 296/169; 280/124.157, 124.177, 6.151, 124.16, 280/754, 755, 789, 800, 6.152
See application file for complete search history.

(56) References Cited

U.S. PATENT DOCUMENTS

| | | | |
|---|---|---|---|
| 3,574,388 A | 4/1971 | Stone | |
| 3,600,866 A | 8/1971 | Stone | |
| 3,822,798 A | 7/1974 | Neff | |
| 4,420,182 A | 12/1983 | Kaneshiro | |
| 4,800,701 A | 1/1989 | Dunsworth | |
| 4,982,971 A | 1/1991 | Marin | |
| 5,533,616 A | 7/1996 | Crowfoot | |
| 6,345,852 B1 | 2/2002 | McCarthy | |
| 6,349,952 B1 * | 2/2002 | Kallstrom | 280/124.157 |
| 6,722,726 B1 | 4/2004 | Parmer | |
| 6,796,263 B2 | 9/2004 | Meyer | |
| 6,834,882 B1 | 12/2004 | Boyd | |
| 2004/0232021 A1 * | 11/2004 | Linton | 206/335 |
| 2005/0029776 A1 | 2/2005 | Koch | |
| 2005/0053442 A1 | 3/2005 | Rash et al. | |
| 2005/0104324 A1 | 5/2005 | Richard et al. | |
| 2005/0179235 A1 | 8/2005 | Stewart et al. | |

* cited by examiner

*Primary Examiner*—Lori L Lyjak
(74) *Attorney, Agent, or Firm*—Bradley Arant Boult Cummings LLP; John Smith T (57) ABSTRACT

A motorcycle trailer includes a base having an upper surface and a lower surface. The base is configured to receive a payload on the upper surface and further configured to support the payload on the upper surface. A first support is attached to the base and configured to support the lower surface of the base above the ground. A cylinder is configured to retract the first support such that the lower surface of the base is lowered to the ground.

20 Claims, 7 Drawing Sheets

MOTORCYCLE TRAILER SYSTEM

FIELD OF THE INVENTION

This invention relates to a motorcycle trailer system. More particularly, this invention relates to a trailer system that may store a motorcycle at a destination and transport the motorcycle to another destination.

BACKGROUND OF THE INVENTION

Many motorcycle enthusiasts and race participants choose to transport their motorcycles to event sites using a trailer. So that the transport of the motorcycle may be effective, the trailer that holds the motorcycle should be elevated off the ground, and seated on road safe tires. In order to minimize continued cost of maintenance on the trailer system, many trailers use a simple two wheel trailer where the wheels are located approximately halfway between the front and back of the trailer.

When the trailer reaches its destination, the trailer must be offloaded and stored because the base of the trailer, supported by a pair of wheels, will be unstable from the front to the back of the trailer. The trailer may then reduce the amount of work space because the trailer is sitting uselessly in a portion of the space.

SUMMARY OF THE INVENTION

An aspect of the invention provides a motorcycle trailer that includes a base having an upper surface and a lower surface. The base is configured to receive a payload on the upper surface and further configured to support the payload on the upper surface. A first support is attached to the base and configured to support the lower surface of the base above the ground. A cylinder is configured to retract the first support such that the lower surface of the base is lowered to the ground.

Another aspect of the invention provides a motorcycle trailer comprising a base, a receiving channel and a hitch. The base has an upper surface and a lower surface. The base is configured to receive a payload on the upper surface and further configured to support the payload on the upper surface. The receiving channel is configured to receive the central member of the hitch. The receiving channel is attached to the lower surface of the base. The hitch is configured to attach to the base. The hitch comprises an elongated central member configured to extend from the base. The hitch is removable from the receiving channel.

Yet another aspect of the invention provides a trailer comprising a base, a first support means, a second support means, and retracting means. The base is configured to support a payload. The first support means are configured to support the base at a first height. The first support means are configured to transport the trailer. The second support means are configured to support the base at a second height. The second support means are configured to stabilize the base. Retracting means are configured to retract the first support means such that the second support means are lowered to the ground.

DETAILED DESCRIPTION OF PRESENTLY PREFERRED EMBODIMENTS

Figure 1:
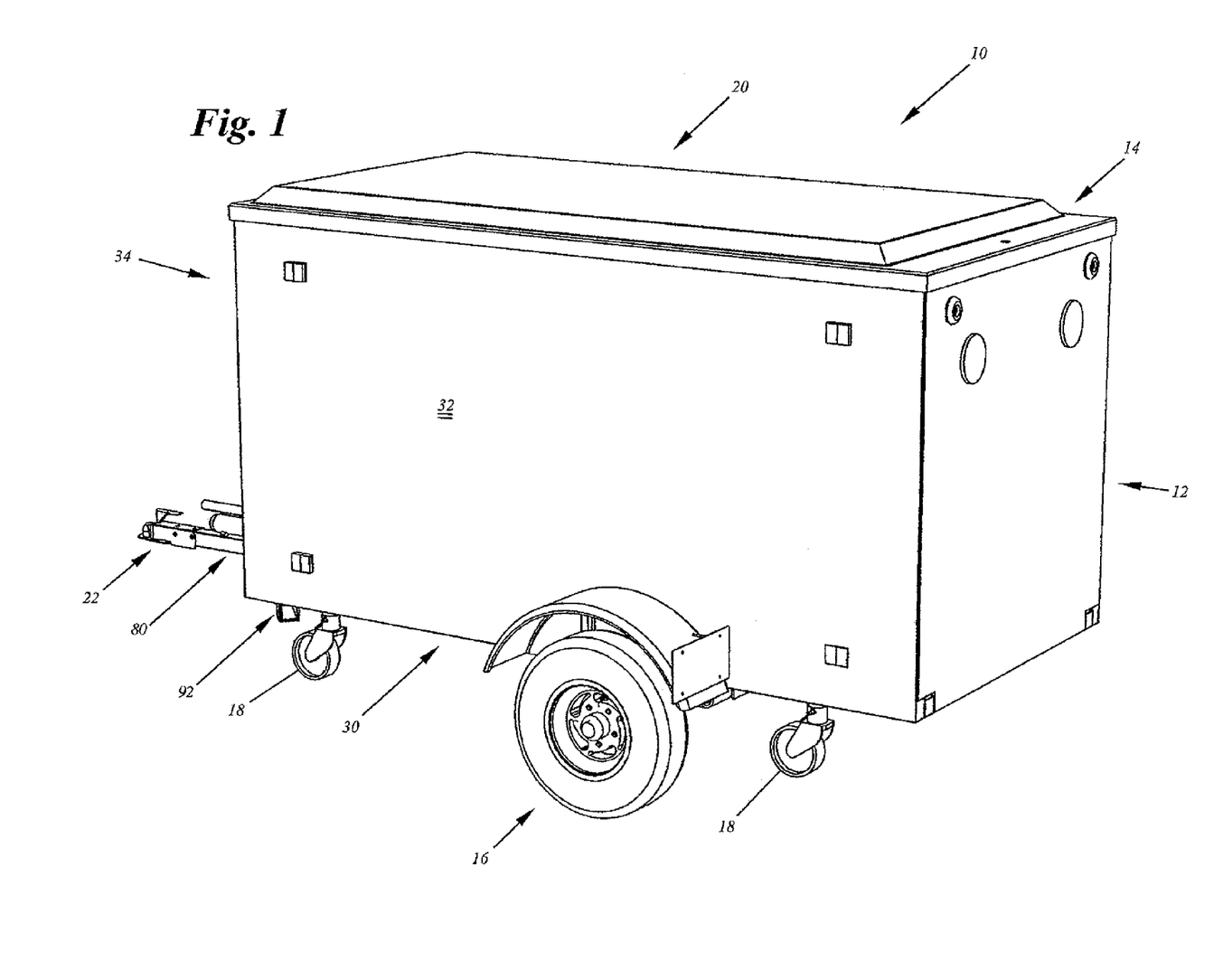
FIG. 1 is a perspective view of a motorcycle trailer according to an aspect of the invention.

Turning now to the figures, the figures display various aspects of the invention. Some components common to multiple figures are described using consistent reference numbers. FIG. 1 is a perspective view of a motorcycle trailer 10 according to an aspect of the invention. The motorcycle trailer 10 includes a gate 12, a carrier body 14, traveling wheels 16, secondary support 18, a lid 20, and a hitch 22. The gate 12 and lid 20 are hingedly connected to the carrier body 14. The traveling wheels 16 are also hingedly connected to the carrier body 14. The hitch 22 and support 18 are connected to the carrier body 14, as will be described subsequently.

The carrier body 14 includes a base 30, sidewalls 32 and a front wall 34. The base 30, sidewalls 32, and front wall 34 are fixedly connected to one another, for example, by welding the co-extending edges of the base 30, sidewalls 32, and front wall 34 to each other. The lid 20 is pinned to the front wall 34. Preferably, the pins that connect the lid 20 to the sidewalls 32 are located inside the carrier body 14 so that no portion of the pin is accessible from the outside of the motorcycle trailer 10. The pins extend perpendicular to the sidewalls 32 and parallel to the front wall 34 and the lid 20. In this orientation, the lid 20 may rotate around the pin and extend upward (as shown in FIGS. 2 and 3).

Figure 2:
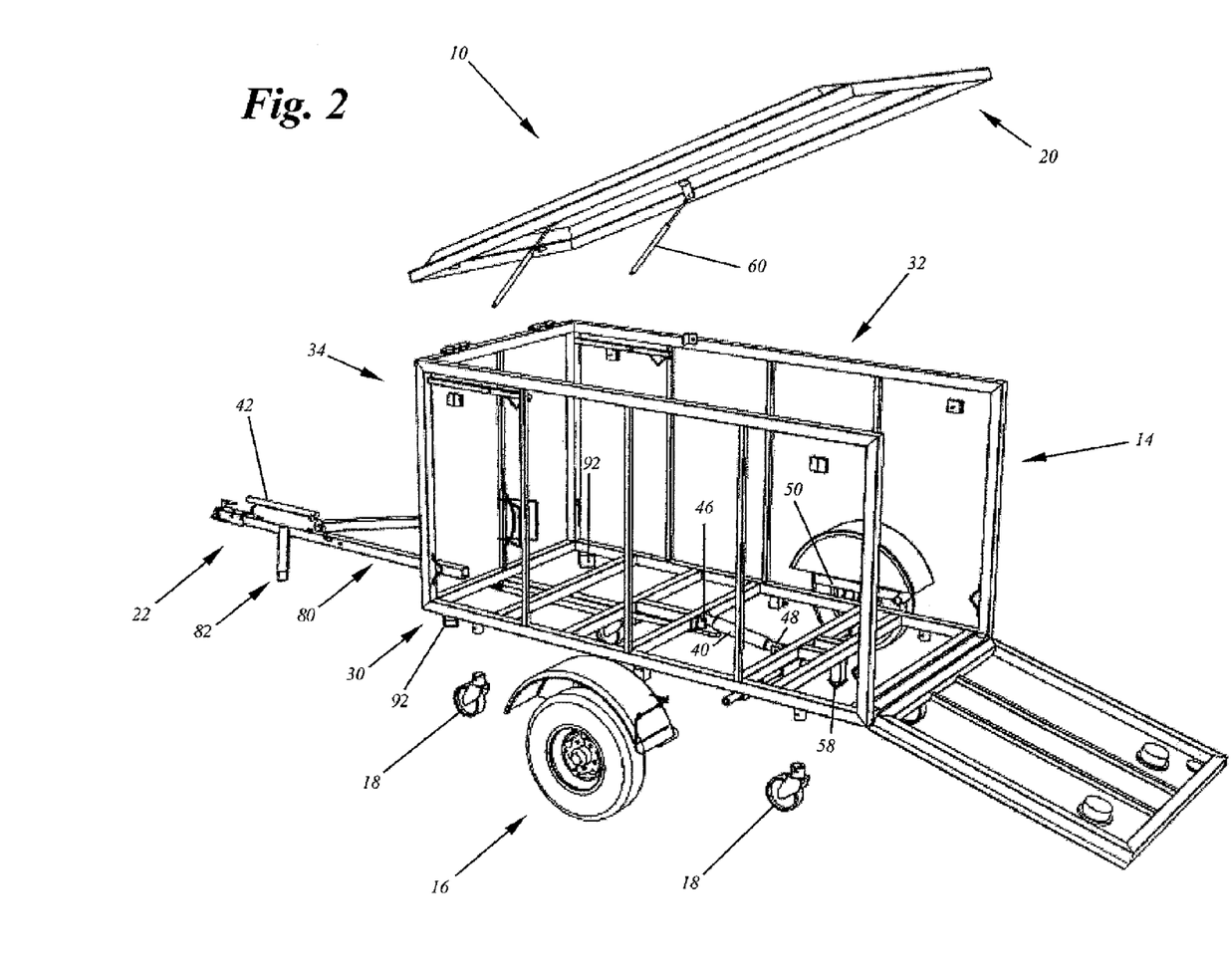
FIG. 2 is a partial view of components of the motorcycle trailer of FIG. 1 with the sides removed.
Figure 3:
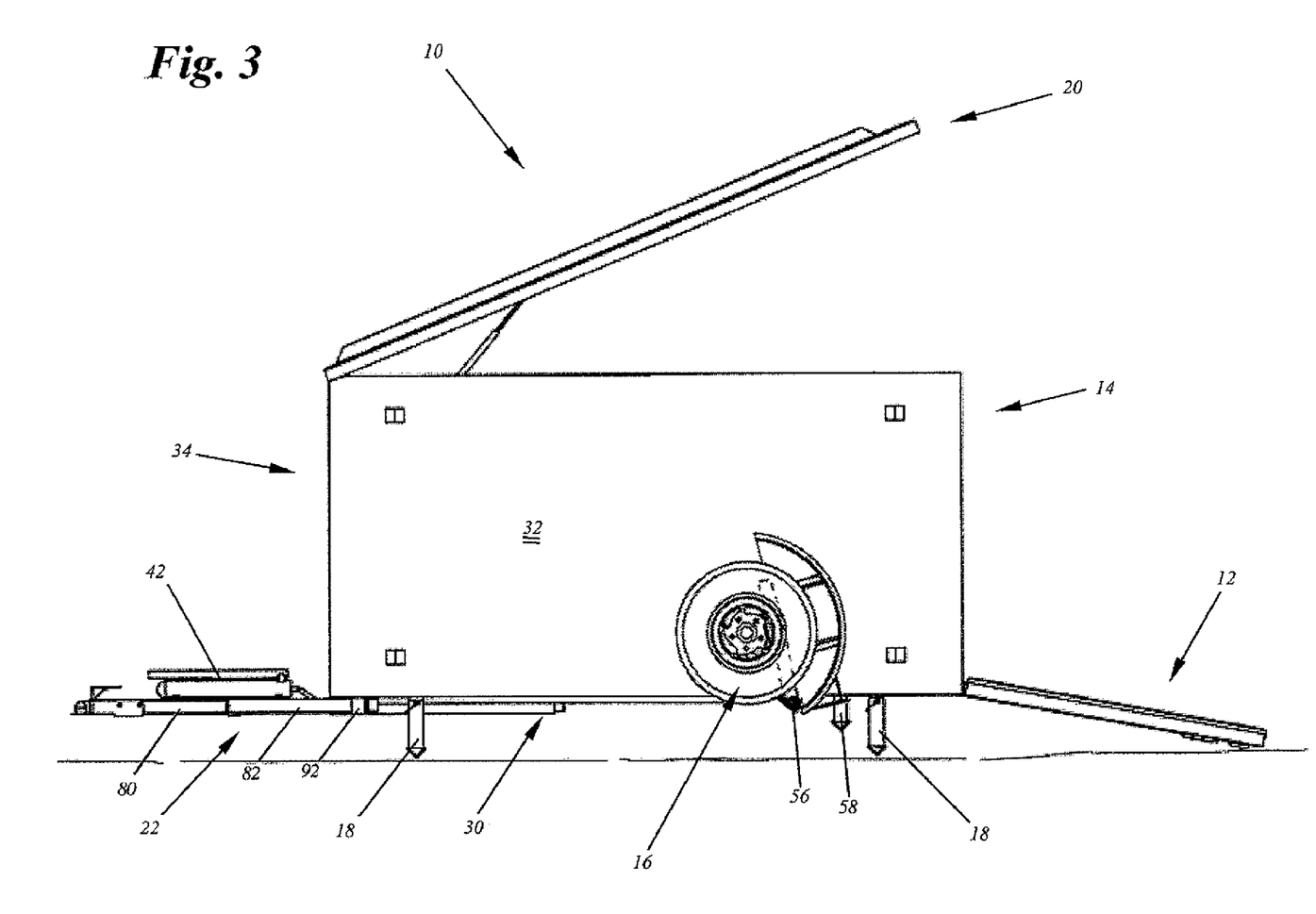
FIG. 3 is a side view of a motorcycle trailer in a second orientation according to an aspect of the invention.
Figures 6A, 6B:
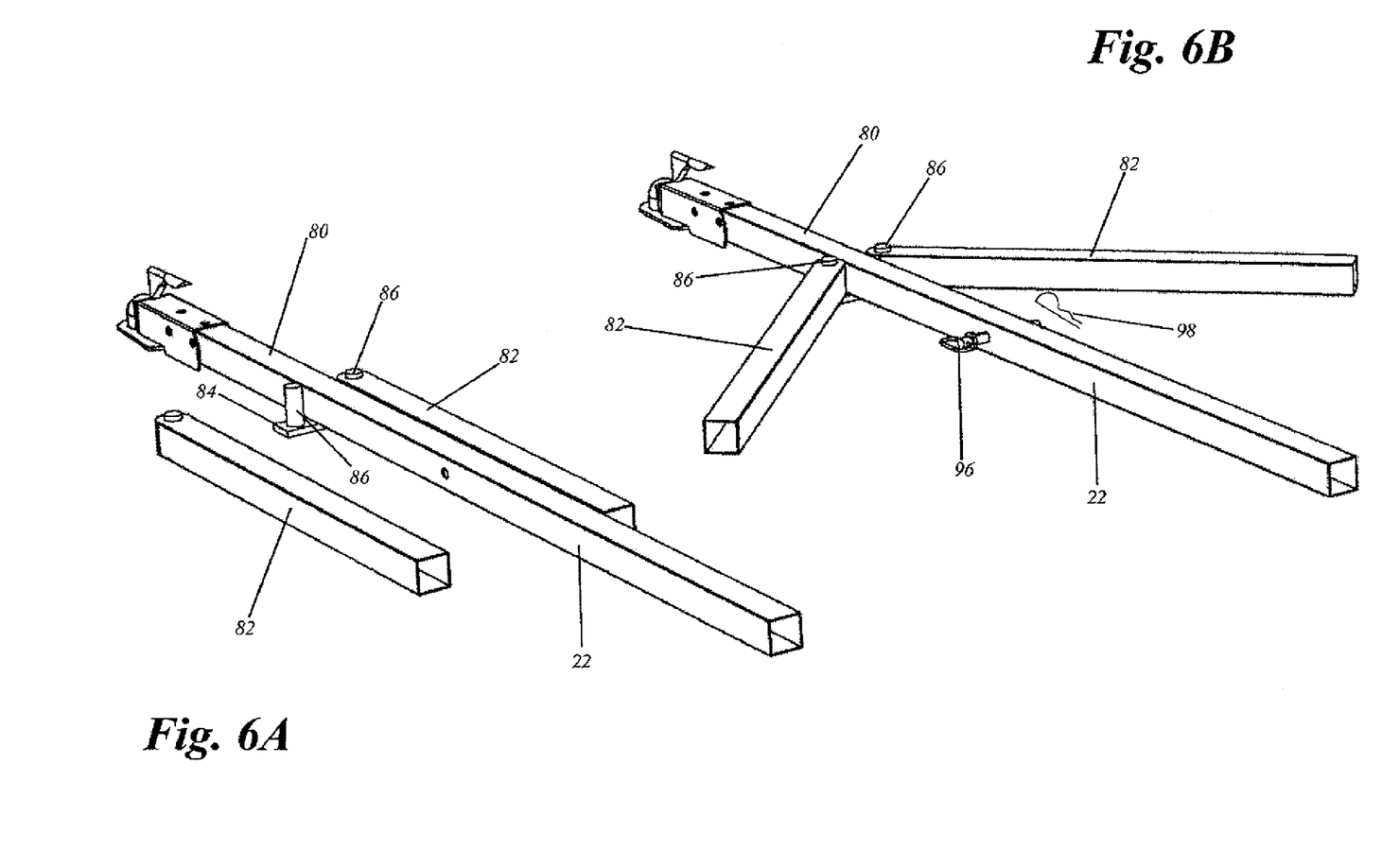
FIGS. 6A and 6B are views of a portion of a motorcycle trailer according to an aspect of the invention.

Similarly, the gate 12 is rotatably fixed to the base 30 so that no portion of the base/gate connection is accessible from the outside of the motorcycle trailer 10, and the gate 12 may rotate open as shown in FIGS. 2 and 3. The hitch 22 is also preferably pinned to the carrier body 14 under the base 30. As depicted in FIGS. 6A and 6B, pins 96 fixedly connect hitch 22 to the base 30.

The hitch 22 may be attached to a car, truck or the like for transportation. The tires for the two traveling wheels 16 are sized for travel across roadway systems. The increased clearance under the trailer 10 also makes travel more convenient. Thus, the configuration makes travel possible while protecting the motorcycle.

Figure 4:
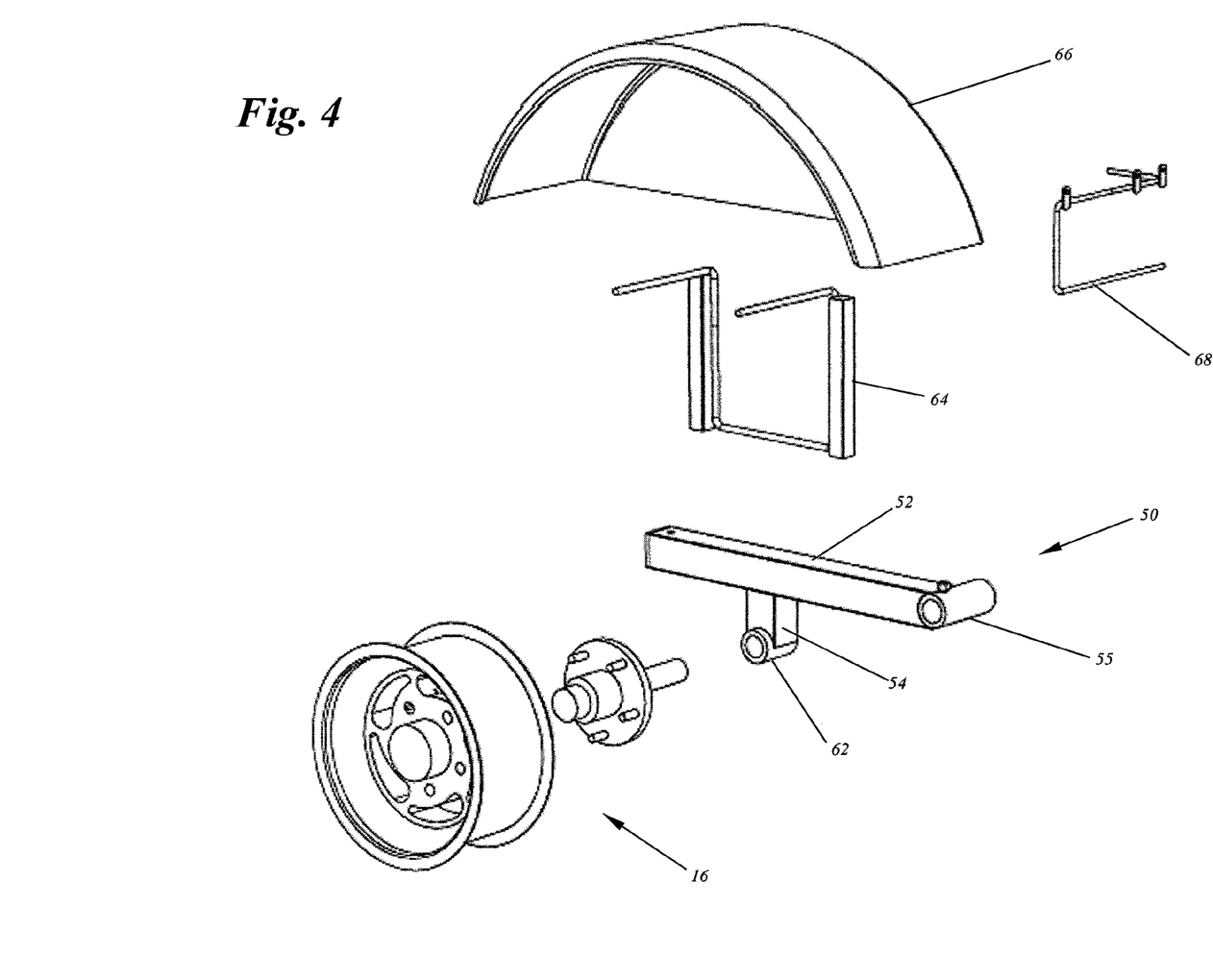
FIG. 4 is an exploded view of parts of the motorcycle trailer of FIG. 1.
Figure 5:
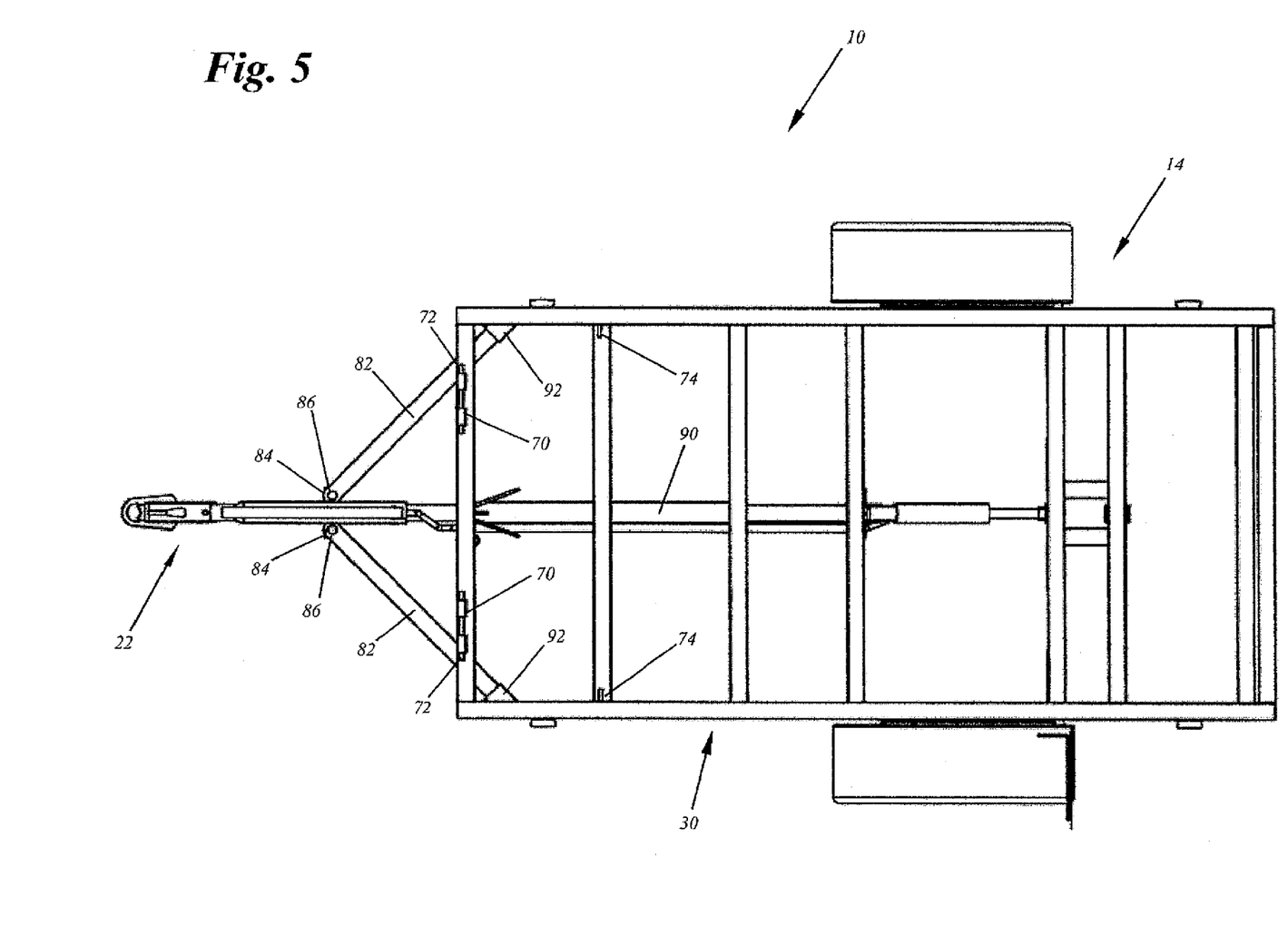
FIG. 5 is a top view of the motorcycle trailer of FIG. 1.
Figure 7:
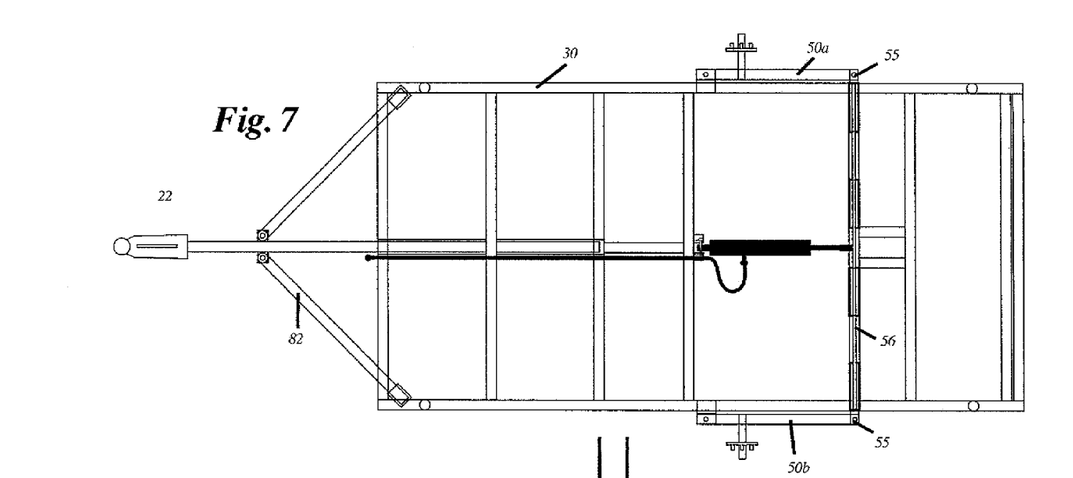
FIG. 7 is a top view of the base of the motorcycle trailer.

Said hydraulic cylinder 40 causes wheel arm 50 to rotate about a fixed point, as will now be explained. Referring to FIG. 4, wheel arm 50 is an L-shaped bar comprising a long member 52 and a short member 54. Said short member 54 extends perpendicularly from long member 52 and supports the traveling wheels 16. As shown in FIGS. 4, 5 and 7 rotating axle 56 spans between and connects long members 52a and 52b of respective wheel arms 50a and 50b at sleeves 55. End 48 of cylinder 40 is secured to axle 56 and exerts a force necessary to cause axle 56 and wheel arms 50 to rotate about the axis of axle 56, as will be further described below. In a preferred embodiment, said moving end 48 is secured at about the mid-point of said axle.

Figures 7A, 7B, 7C:
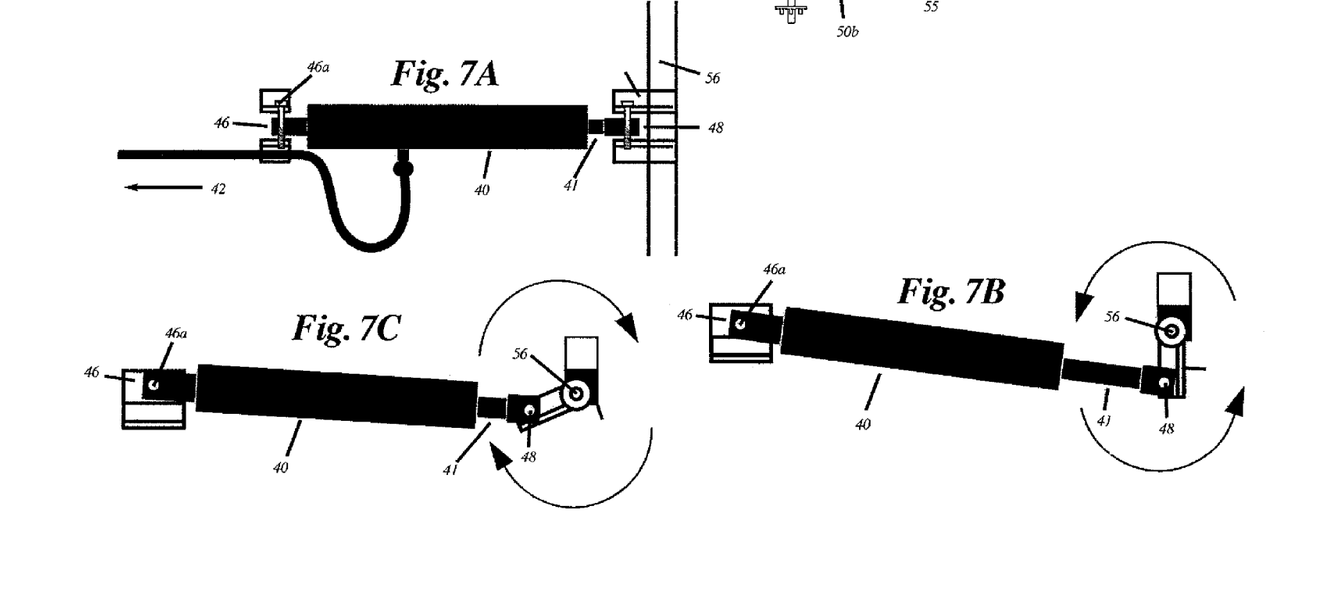
FIG. 7A is a top view of the pneumatic cylinder and axle.
FIG. 7B is a side view of the pneumatic cylinder and axle, with the arm of the cylinder in the extended position.
FIG. 7C is a side view of the pneumatic cylinder and axle with the arm of the cylinder in a retracted position.

Referring to FIGS. 7 and 7B, in operation, to raise trailer 10 (i.e., making the trailer ready to travel), hydraulic pressure from hydraulic pump 42 is applied to hydraulic cylinder 40 thereby extending cylinder arm 41 and end 48. The resulting force exerted by end 48 on axle 56 causes said axle and wheel arms to rotate towards the front wall 34, lowering long members 52, short members 54 and wheels 16 to the ground. As wheels 16 are lowered onto the ground, and hydraulic cylinder 40 continues to exert sufficient force to cause the rotation of axle 56, an opposing force is exerted upwardly against base 30 causing said carrier body 14 of trailer 10 to rise relative to the ground.

Referring to FIG. 7C, to lower trailer 10 (i.e., making it ready for storing any contents), hydraulic pressure from hydraulic pump 42 is released from hydraulic cylinder 40. Cylinder arm 41 and end 48 retract due to the gravitational force from the weight of the trailer. As end 48 retracts, axle 56 and wheel arms 50 rotate towards gate 12, raising long members 52, short members 54 and wheels 16 from the ground, lowering carrier body 14 to the ground. When the hydraulic cylinder arm 41 has fully retracted, the traveling wheels 16 are completely disengaged from the ground and the secondary supports 18 support the weight of the carrier body 14, as shown in FIG. 3. In a preferred embodiment, hitch 22 is removable from the trailer 10, permitting storage of the hitch inside trailer 10.

Turning now to FIG. 2, FIG. 2 is a partial view of components of the motorcycle trailer 10 of FIG. 1 with the sides removed. Referring as well to FIG. 7, the motorcycle trailer 10 comprises a retracting means configured to rotate the wheel assembly about an axle connected to the wheel assembly. In the preferred embodiment, said means comprises a hydraulic pump 42 and a hydraulic cylinder 40, said cylinder comprising a fixed end 46, an arm 41 and a moving end 48. Said fixed end 46 is pivotally connected to base 30 to permit said cylinder to pivot about a connection means, preferably a pin or similar device. In the preferred embodiment, pin 46a connecting said fixed end 46 to base 30 extends in perpendicular fashion to the sidewalls 32 and parallel to the front wall 34 and the lid 20.

In an alternate embodiment, the secondary supports 18 may be changed from support casters as shown in FIGS. 1-2 and replaced with stationary supports as shown in FIGS. 3 and 5. In such an embodiment, the carrier body 14 would be lowered to the stationary supports. A chassis foot 58, as shown in FIG. 2, may be attached to the base 30 to protect the hydraulic cylinder 40, wheel arm 50 and axle 56 from hitting uneven portions of the ground. The carrier body 14 may also be attached to posts through holes where the supports 18 were located so that the trailer 10 may be secured to a location.

In the lowered (i.e., storing) position, the secondary supports 18 support the carrier body 14. Although it will be understood that three supports will be sufficient to support base 30, it will be appreciated that in the preferred embodiment, the carrier body 14 has four points of support located generally at the perimeter of the carrier body 14, which increases the stability of the trailer 10. It will be further appreciated that in the lowered position, the center of gravity of the carrier body 14 is also lowered. The lower center of gravity adds to the stability of the trailer 10. Because the supports 18 may also be wheels or casters, which may themselves be detachable, it is possible to move the motorcycle trailer 10 around while in the lowered position. As shown in FIGS. 1 and 2, when the trailer 10 is lowered onto casters, the trailer 10 may be maneuvered locally into tighter spaces for storage.

Removing a motorcycle from the trailer 10 is facilitated by opening the lid 20 and lowering the gate 12. The lid 20 is raised when a user pushes the lid 20 upward near the gate 14. A pair of pneumatic springs 60 supports the weight of the lid 20 so that the lid 20 remains raised after the user releases the lid 20. The raised lid 20 allows for clearance of a user who enters the trailer 10. The lowered gate 12, which when lowered is supported by the ground, allows access within the carrier body 14.

The hydraulic pump 42 in FIG. 3 is located on hitch 22 outside the trailer, for ease of access. However, the pump may also be located inside the trailer, for instance, on the front wall 34 of the motorcycle trailer 10, or on different surfaces on the outside or the inside of the motorcycle trailer 10. Referring to FIG. 7c, a flexible hose from the pump 42 to the cylinder 40 is sized to allow placement of the pump 42 at the desired position relative to in the motorcycle trailer 10. In another embodiment, the hydraulic pump 42 may be attached to the hydraulic cylinder 40 through a quick release connection. In such an embodiment, the hydraulic pump 42 need not be attached to the motorcycle trailer 10. Instead, the pump 42 may be attached to the quick release connection when the user actuates the cylinder 40, and stored, for example, in the trailer 10 when the cylinder is not actuating. The hydraulic pump may be a manual pump or may be an electrically powered pump.

Turning now to FIG. 4, FIG. 4 is an exploded view of the wheel assembly portion of the motorcycle trailer of FIG. 1. The arm 50 attaches at sleeve 55 to the axle 56. The sleeve 55 is rigidly attached to the axle thereby facilitating rotation of wheel arm 50. On the short arm, 54, the wheel 16 is rotatably connected to the arm 50 in a second sleeve 62. A fender support 64 supports a fender 66 above the wheel 16. A license plate holder 68 may also be attached to the fender 66.

Turning now to FIG. 5, FIG. 5 is a top view of the motorcycle trailer 10 of FIG. 1. In this view, the lid 20 and base body are removed from the trailer 10. A pair of hinges 70 on the front wall 34 of the carrier body 14 attaches the lid 20 to the carrier body 14. Pins 72 slide into the hinges 70 to connect the lid 20 to the carrier body 14. In the preferred embodiment, because the hinges 70 and pins 72 are located inside the body 14 of the trailer 10, the pins 72 are not accessible from outside the trailer 10.

Referring to FIGS. 2 and 5, frame spring mounts 74 are located on the sidewalls 32 of the carrier body 14. The frame spring mounts 74 attach the pneumatic springs 60 to the inside of the carrier body 14. The other ends of pneumatic springs 60 are attached to the inside of the lid 20. The frame spring mounts 74 attach the springs 60 to the sidewalls 32 with pins so that the springs 60 may rotate as the lid 20 is raised.

Referring to FIGS. 5, 6A, and 6B, the central member 80 of the hitch 22 is received in a central receiver channel 90 on the base 30 of the carrier body 14. Arms 82 are hingedly attached to the central member 80 in the following manner. A flange 84 is attached to and extends perpendicularly from the central member 80. Fixed post 86 extends in upward fashion from flange 84 through arm 82 allowing arm 82 to be rotated about post 86 away from and towards central member 80. The arms 82 of the hitch 22 are received in arm receiver channels 92 located at lateral orientations of the carrier body 14. A hitch pin 96 is passed through the central member 80 and central receiver channel 90. The hitch pin 96 fixes the hitch 22 to the carrier body 14. A cotter pin 98 fixes the hitch pin 96 in place so that the hitch pin 96 does not back out of the central receiver channel 90. The arms 82 are pressed into the arm receiver channels 92 and remain in the channels 92 through natural forces created by the weight of the trailer.

The hitch 22 is configured to add stability to the carrier body 14 during transport. The arms 82 are attached at lateral positions to stabilize the carrier body 22 by supporting the carrier body 14 from moments generated around the central member 80. Such moments may be generated when the motorcycle trailer 10 turns or when the sides of the motorcycle trailer 10 move relative to one another.

The hitch 22 is designed to be removable. The hitch 22 may be removed from the carrier body 14 and stored, for example, in the carrier body 14. When the hitch 22 is removed, the total length of the motorcycle trailer 10 may be shortened so that storage of the trailer 10 may be easier. Removing the hitch 22 may also limit the ability of others to attach the trailer 10 to another vehicle. As was described with respect to FIG. 5, the central member 80 and the arms 82 are received in the base 30 of the carrier 14 and are pinned in place.

As will be apparent to one skilled in the art, various modifications can be made within the scope of the aforesaid description. Such modifications being within the ability of one skilled in the art form a part of the present invention and are embraced by the claims below.

It is claimed:

1. A motorcycle trailer comprising:
a base having an upper surface and a lower surface, the base being configured to support a payload on the upper surface;
a first support attached to the base and configured to support the lower surface of the base above the ground;
a means to retract the first support such that the lower surface of the base is lowered toward the ground;
a pair of sidewalls attached to and extending perpendicularly from the base;
a front wall attached to and extending perpendicularly from the base;
a gate attached to and extending perpendicularly from the base;
a lid parallel to the base and attached to the front wall; and
a second support attached to the base and configured to support the lower surface of the base above the ground once the first support has been retracted.

2. The motorcycle trailer of claim 1, further comprising:
a first hinge configured to attach the lid to the front wall;
a second connection configured to rotatably attach the gate to the base;
a hitch configured to attach to the base, the hitch comprising an elongated central member configured to extend from the base;
a receiving channel configured to receive the central member of the hitch, the receiving channel being attached to the lower surface of the base;
a pair of arms configured to extend from the central member of the hitch, the arms being configured to attach to the base at positions under the sidewalls; and
a pair of receiving channels configured to receive the arms of the hitch, the pair of receiving channels being attached to the lower surface of the base.

3. A trailer, comprising,
a base configured to support a payload;
a first support means configured to support the base at a first height, the first support means configured to transport the trailer;
a second support means configured to support the base at a second height, the second support means configured to stabilize the base; and
retracting means configured to retract the first support means such that the second support means are lowered toward the ground.

4. The trailer of claim 3, further comprising hitching means configured to attach to the base such that the trailer may be hitched to a vehicle.

5. The trailer of claim 4, wherein said hitching means are removable from the base.

6. The trailer of claim 3, further comprising an enclosure supported by the base.

7. The trailer of claim 6, wherein the enclosure comprises a lid hingedly attached thereto.

8. The trailer of claim 7, wherein the enclosure comprises a gate rotatably connected with the base.

9. A trailer, comprising,
a base, said base having an upper and a lower surface;
wheel arms rotatably connected to said base;
wheels connected to said wheel arms;
rotating means to rotate said wheel arms and said wheels into a lowered position; and
a support means configured to support said base when said rotating means has rotated said wheel arms and said wheels from said lowered position.

10. The trailer of claim 9, wherein said rotating means comprises an axle secured to said wheel arms, said axle further being connected to a hydraulic cylinder that causes said axle to rotate.

11. The trailer of claim 9, further comprising:
a pair of sidewalls attached to and extending perpendicularly from said base;
a front wall attached to and extending perpendicularly from said base;
a gate attached to and extending perpendicularly from said base; and
a lid hingedly attached to any of said walls.

12. The trailer of claim 11, wherein said lid is hingedly attached to an upper edge of said front wall.

13. The trailer of claim 9, further comprising a hitch removably attached to said base, said hitch comprising an elongated central member extending from said base.

14. The trailer of claim 13, wherein said base further comprises a central channel for restraining said central member of said hitch.

15. The trailer of claim 13, wherein said hitch further comprises a pair of hinged arms being extendable from said central member, said arms being attachable at their respective extremities to said base.

16. The trailer of claim 15, wherein said base further comprises a pair of receiving channels configured to receive said extremities of said arms, said receiving channels being attached to the periphery of said lower surface of said base.

17. The trailer of claim 9, wherein said support means comprises a plurality of rigid legs extending from said lower surface of said base.

18. The trailer of claim 17, further comprising a plurality of detachable casters attached to said legs.

19. The trailer of claim 9, wherein said rotating means comprises a pneumatically retractable arm attached to a rotatable axle, said axle being secured to said wheel arms.

20. The trailer of claim 19, wherein said retractable arm causes said axle to rotate said wheel arms in downward fashion relative to the ground as said arm is extended upon application of pneumatic pressure.

* * * * *

UNITED STATES PATENT AND TRADEMARK OFFICE
CERTIFICATE OF CORRECTION

PATENT NO.       : 7,654,609 B1                                    Page 1 of 1
APPLICATION NO.  : 11/435484
DATED            : February 2, 2010
INVENTOR(S)      : McNutt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 440 days.

Signed and Sealed this

Twenty-third Day of November, 2010

David J. Kappos
*Director of the United States Patent and Trademark Office*